Figure 1:
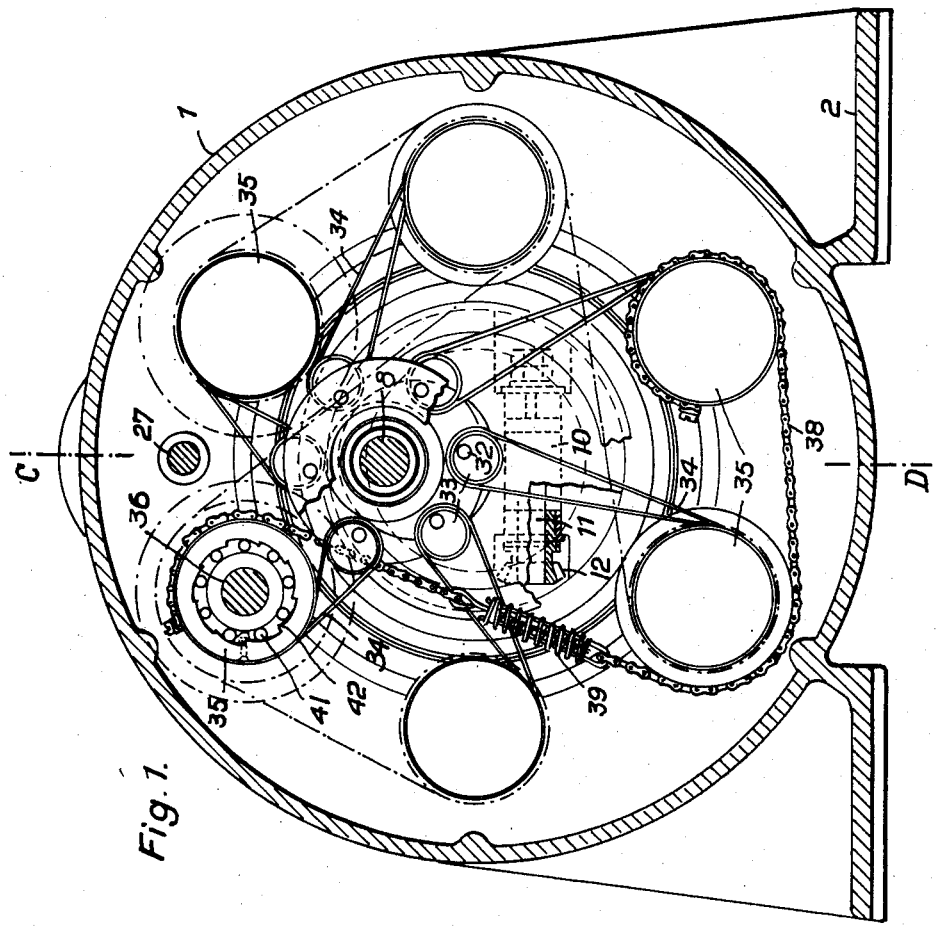

July 14, 1931.        H. FÜSSEL        1,814,030
INTERMITTENT ACTUATING GEAR
Filed June 7, 1930        3 Sheets-Sheet 1

INVENTOR:
Herbert Füssel
By
Attorney

July 14, 1931.  H. FÜSSEL  1,814,030

INTERMITTENT ACTUATING GEAR

Filed June 7, 1930  3 Sheets-Sheet 3

INVENTOR:
Herbert Füssel

Patented July 14, 1931

1,814,030

UNITED STATES PATENT OFFICE

HERBERT FÜSSEL, OF DRESDEN, GERMANY, ASSIGNOR TO GETRIEBEBAU G. M. B. H., OF DRESDEN, GERMANY

INTERMITTENT ACTUATING GEAR

Application filed June 7, 1930, Serial No. 459,725, and in Germany September 25, 1928.

Intermittent actuating gears are already known, in which a number of shafts are intermittently actuated from an eccentric or cam disc and, in turn, engage and intermittently actuate a driven shaft, the ratio of transmission being modified by altering the eccentricity or shape of the cam of the driving shaft. In gears of this kind, the movement is usually transmitted from the driving shaft, by the aid of the said eccentric or cam, to the actuating shafts through connecting rods or cranks. Hence, the primary result was a limitation of the ratio of transmission, because this is dependent on the ratio of the length of the rocker or connecting rod to the throw of the crank. Moreover, these gears operate in a jerky manner, so that the movement of the driven shaft is not uniform, but irregular.

It has therefore already been proposed to effect the transmission of the movement of the driving shaft to the intermediate shaft by means of flexible traction members, on which an intermittent pull is exerted on the one side by rotating the driving shaft, whilst their other ends are passed round discs, drums or the like which are to be coupled with the intermediate shafts.

The principal object of the present invention is to enable the ratio of transmission, in gears of the kind last mentioned, to be modified within convenient limits, and in a simple and reliable manner, both when the gear is at rest or running. This object is mainly achieved in that the pull is transmitted to the traction members through a variable eccentric actuated by the driving shaft, the shaft of said eccentric being provided with one or more eccentric discs which are eccentrically mounted in rotational bodies connected with the driving shaft and adapted to be turned therein, so that a relative radial displacement is set up between the axes of the eccentric shaft and the driving shaft. The rotation of the eccentric discs connected with the eccentric shaft is preferably effected by worm or worm-wheel gear, the one member of which is disposed on the driving shaft and the other on the eccentric disc, and which is connected with a differential gear the fixed member of which can be rotated by hand during the rotation of the shaft. Another object of the invention is to enable uniform transmission of movement to be obtained between the driving and driven shaft of the gear by designing the curvature of those portions of the discs, drums, or the like (mounted on the intermediate shafts) which are embraced by the traction members acting on the eccentric shaft, in such a form that a uniform rotation of the intermediate shaft is obtained irrespective of the rate of the tractive effort for the time being.

Figure 2:
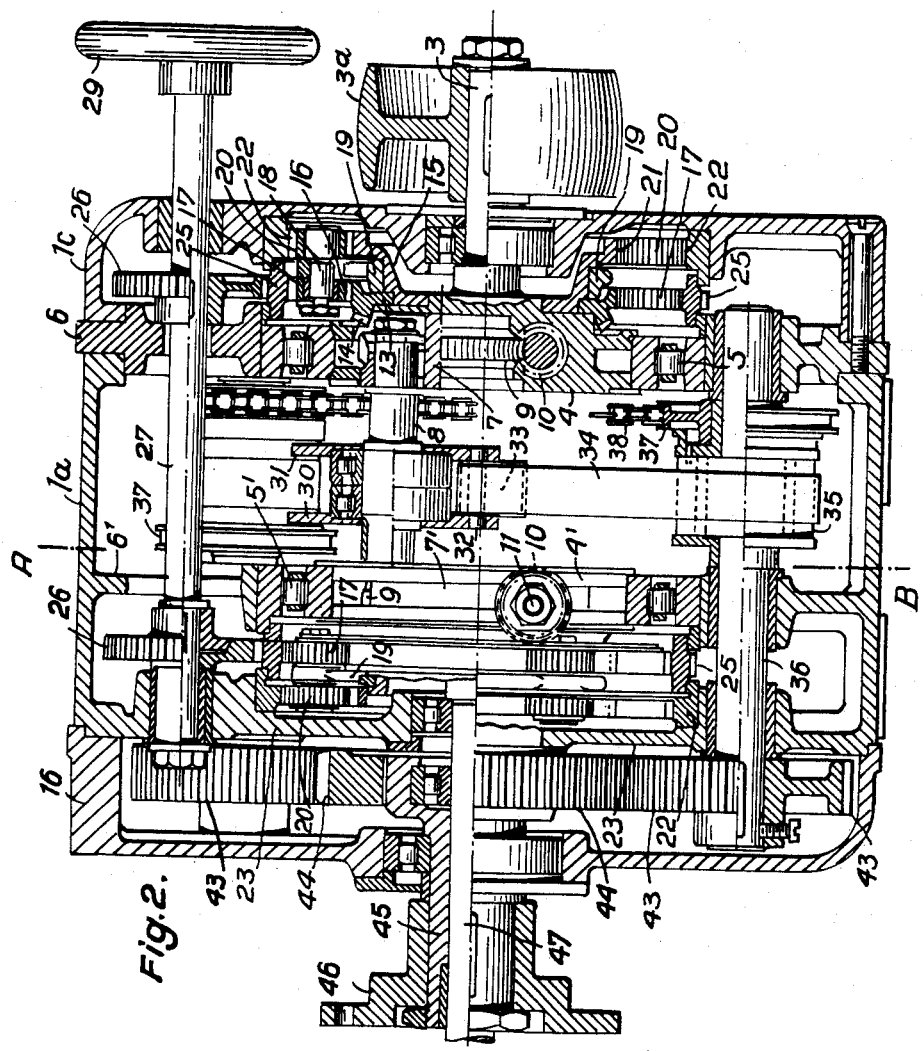
Figure 3:
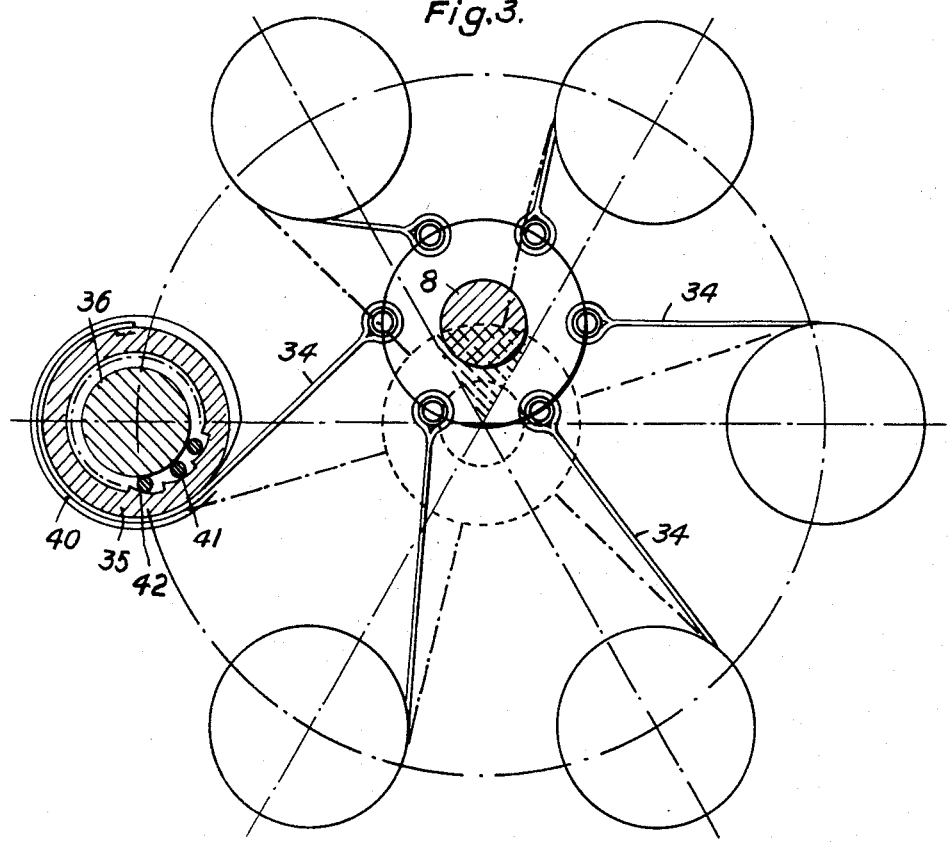
Figure 4:
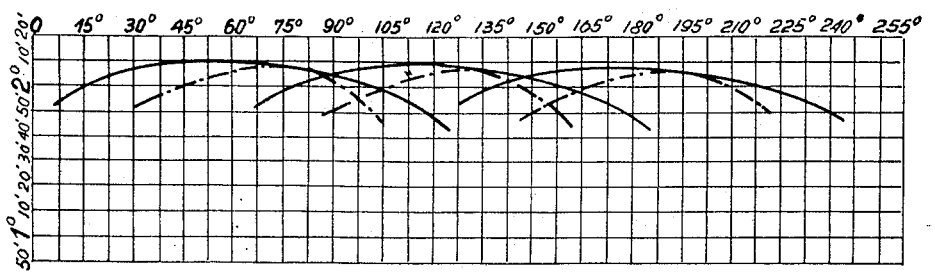

A typical embodiment of the invention is illustrated in the drawing, in which Figure 1 is a cross section through the gear, in the direction of the line A—B of Figure 2; Figure 2 is a section through Figure 1, in the direction of the line C—D of Fig. 1; Figure 3 is a diagrammatic representation of the drive in different settings of the eccentric, and Figure 4 is a comparative diagram of the characteristic of the new gear in contrast to the known crank gears.

In Figures 1 and 2 of the drawings, 1 is the gear case, which can be secured on the floor, or on the wall, in any convenient manner, by means of the foot 2. As can be seen from Figure 2, the case consists substantially of a central portion 1a and two covers 1b and 1c.

In the cover 1c of the case is mounted a driving shaft 3 the projecting end of which carries a belt pulley 3a. The inner end of the shaft 3 carries a drum, or disc member 4, which is either integral with the shaft or firmly secured thereon. The member 4 is mounted in a vertical partition 6 of the case 1, by means of roller bearings 5. Preferably a disc member 4', of the same design as 4, is mounted to correspond with the member 4, inside the case and in such a way that a space is left between the members 4 and 4'. Like the member 4, the member 4' is mounted in roller bearings 5' in a vertical partition 6' in the part 1a of the case, and is driven at the same peripheral velocity as that at which the shaft 3 drives the member 4, so that the two members 4 and 4' revolve synchronously. Eccentrics 7, 7' are mounted in the members 4, 4' respectively and are connected together by a shaft 8. Each of the eccentrics 7, 7' carries on its periphery a worm crown 9, engaged, in each case, by a worm 10 mounted in the member 4 (4'), so that rotating the worms 10 causes the eccentrics 7, 7' to turn in the interior of the members 4, 4', thereby enabling the radial distance between the central line of the shaft 8 and the rotational axis of the shaft 3 to be adjusted. For the purpose of such rotation, the one end of the worm shaft 11, mounted in the member 4 (4'), carries a cone pinion 12 (Figure 1) gearing with conical teeth 14 provided laterally on a crown wheel 13. The crown wheel 13 is rotatably mounted on a stepped hollow cylinder 15, secured on the member 4, and is provided, on its outer periphery, with spur teeth 16 gearing with a number of pinions 17 distributed over the periphery. The axes 18 of said pinions are mounted in a ring 19, adapted to turn freely on the stepped hollow cylinder 15, and carry on their other end another pinion 20 gearing with a toothed crown 21 on the outer periphery of the hollow cylinder 15. The said pinions 20 also mesh with a fixed toothed crown 22. The two toothed crowns 22 are mounted in the cover 1a or in a vertical wall 23 in the central portion 1a of the case, and are secured by screws or in any other suitable manner. Round the pinions 17 is disposed a toothed crown 25 with external and internal teeth. The internal teeth engage in the pinions 17, whilst the external teeth of the two crowns 25 engage respectively with pinions 26, the common shaft 27 of which is rotatably mounted in the vertical wall 23 of the portion 1a of the case and in the cover 1c, and carries, on the end projecting outside the casing, a hand wheel 29 by means of which it can be turned.

On the shaft 8 are seated two discs 30, 31, which are connected together by a number—six in the present instance—of pins 32, on which are secured eccentric rollers or discs 33 round which are laid the looped ends of bands 34. Each of the bands 34 is carried round a disc 35, the axes 36 of which are rotatably mounted in the portion 1a of the gear case. The outer ends of the bands 34 are attached to the discs 35 (Figure 1), so that the exertion of a pull on the bands 34 sets the disc 35 in rotation. In addition to the discs 35, these axes also carry discs 37 disposed alternately on either side of the discs 35. Round the discs 37 are laid chains or bands 38, which are composed of two parts, connected together by a spring 39, the free end of each chain 38 being attached to a disc 35. Preferably, two relatively remote discs 35 are selected for being interconnected and for this purpose—in the example illustrated—the arrangement chosen is such that each of the chains 38 laid round the discs 37, provided beside the discs 35, is attached, at one end to the succeeding disc 35 and at the other end to the next but one disc 35, so that the ends of the chain are thus attached to diametrically opposite discs 35. The purpose of the chains 38 is to keep the bands 34 in tension, that is, to return the discs 35, which are turned in the one direction by the bands 34, into their original position when the pull exerted by said bands ceases. As can be seen from Figure 2 the bands lie centrally on the discs 35, and a chain 38 is provided on each side of the bands. The perimeter of the discs 35 on which these bands 34 run is not cylindrical, but—as can be seen more particularly from Figure 3—the discs 35 are provided with a curved surface 40 for the purpose of so ordering the rotational movement transmitted from the eccentric shaft 8 to the discs 35 by means of the bands 34, that a uniform rotational movement is imparted to the discs 35 concerned during the movement of the (preferably steel) bands 34 in both directions, although, as the result of the eccentric movement of the shaft 8, the point of application of the bands 34 on the eccentric shaft 8 describes an irregular movement in the radial direction. In this way, it is intended to assure uniformity in the rotational movement of the discs 35, at least during the period in which the movement of each disc is transmitted to the driven shaft in the manner hereinafter described. The discs 35 are designed as bushes, and are mounted on the shafts 36 by means of balls, rollers, or similar members 41, in the manner known in connection with free-wheel clutches. The rollers, balls or the like bear, on the one hand, gainst the shaft 36 and on the other against eccentric surfaces 42 on the inside of the bush-like discs 35, so that, during the movement in one direction—namely that in which the bands 34 exert a pull on the discs 35—the discs are coupled to the shaft 36, whereas during rotation in the opposite direction, the discs 35 turn freely and the shafts 36 remain stationary. The curvature of the surfaces 40 may be so designed that the discs 35 move rapidly during the period in which the coupling is effected by the clutch member 41, in order to effect the coupling quickly. The shafts 36 carry pinions 43' (Figure 2) disposed round and meshing with a pinion 44, disposed inside the portion 1b of the casing 1 and mounted on the end of the hollow driven shaft 45, the outer end of which carries a flanged clutch member 46. Inside the hollow shaft 45 is a shaft 47 secured to, or integral with, the member 4' surrounding the eccentric 7'.

The gear operates in the following manner. As soon as the shaft 8 is set eccentrically in relation to the driving shaft 3, the rotation of shaft 3 results in the bands 34 being drawn or released owing to the eccentric movement of the shaft 8. At each pull, the discs 35 are rotated, coupled to the corresponding axis or intermediate shaft 36, and transmit a rotational movement to the pinion 44 and shaft 45 through the pinions 43. During the second portion of the movement of the eccentric, in which the bands 34 are released, the discs 35 are turned in the opposite direction by the springs 39 and chains 38, and uncoupled from the shafts 36 and returned to their original position. Owing to the provision of a number of discs 35 (for example six), a driving effort is transmitted each time through a number of pinions 43, and since, owing to the design of the curved surfaces 40, it is possible to impart a uniform rotational velocity to the pinions 43, so long as they actuate the pinion 44, perfectly uniform rotation of the driven shaft 45 is obtained.

The ratio of transmission between the driving shaft 3 and the driven shaft 45 can be adjusted by varying the eccentricity of the shaft 8 in relation to the shaft 3. The adjusting device, which has already been described, operates in the following manner. During the rotation of the shaft 3, the member 4 is coupled, with the eccentric 7 carrying the shaft 8, owing to the self-locking action between the worm 10 in the member 4 and the worm-wheel teeth of the eccentric 7. The member 4' is also coupled to the shaft 8 in a corresponding manner, so that the two members 4, 4' revolve synchronously.

Since the worm shafts 11 gear, by means of the cone pinion 12 secured on their end, with the conical teeth 14 of the crown wheel 13, this latter is thereby coupled to a certain extent with the members 4, 4', and therefore also rotates with the same velocity. The spur teeth 16 on the crown wheel 13, in rotating, turn the pinions 17 with which they engage. Since the pinions 17 gear with the double crown wheel 25, which is normally stationary, they are obliged to roll between this stationary wheel and the revolving crown wheel 13, the ring 19, which carries the shafts 18 of the pinions 17, turning about the hollow cylinder 15. This rotational movement is also compulsorily effected in that the pinions 20, mounted on the same shaft as the pinions 17, gear, on the one hand, with the crown 21—which turns with the same velocity as the crown 13—and, on the other, with the stationary crown wheel 22. The pinions 17 and 20 must, of course, have the same diameter and number of teeth, and similarly, the crown wheels 21 and 22 must correspond exactly to the crown wheels 16 and 25.

Accordingly, while the gear is running normally, a fast coupling exists between the shaft 3 and the shaft 8, without this coupling being disturbed in any way by the pinion gearing. If now, it is desired to set up a relative rotation between the shaft 3 and the eccentrics 4, 4' carrying the shaft 8, all that is necessary is to turn the hand wheel 29 in one or the other direction. This movement rotates the two crown wheels 25 through a corresponding angle. Since the pinions 17 and 20 are secured on the same shaft, the pinions 20 must undergo a corresponding displacement in relation to the crown wheel 22. This causes the pinions 17 to turn and therefore to turn both the crown wheels 13 and 21 in the same direction, since the pinions 20 engage in the stationary crown wheel 22 with different velocity. The result is to turn the crown wheel 13, and with it the conical teeth 14, in relation to the member 4, or 4', on which the hollow cylinder 15 carrying the crown wheel 21 is mounted, and consequently the corresponding worm is also turned, by the cone pinion 12, through a corresponding angle in one or the other direction. The worm 10, however, effects in turn a relative adjustment between the member 4, or 4' and the eccentric 7, or 7', thus modifying the radial distance between the shaft 3 and the eccentric shaft 8.

Figure 4 shows a comparison between a gear of the kind hitherto known—in which the transmission is effected by connecting rods and cranks, and therefore with the aid of ratchet teeth—and the drive according to the invention. In the figure, two curves are shown, the angular velocities of the ratchet shaft being plotted vertically (abscissas) and the angular throw of the eccentrics horizontally (ordinates). The dot-and-dash curve 50 represents the succession of the actuating impulses by the connecting rods and cranks in the case of six ratchet members. It is evident that the individual impulses overlap in such a way as to give rise to an irregular curve, and consequently to irregular, jerky and noisy running. The curve 51 on the other hand represents the progression of the angular velocity of the driven shaft in accordance with the invention, six actuating members being also employed. It is evident that the several sections constituting the curve display a horizontal course, after a short rapid rise, and finally a rapid fall. The various sections of the curve overlap in such a way that the uniform portions succeed one another, so that, as a matter of fact, perfectly uniform velocity is present throughout the entire drive.

The various members shown in the drawings as composing the gear are, of course, given merely by way of example, and may be modified in point of construction, in various ways, without exceeding the scope of the invention. For example, it will be sufficient, in certain cases, to provide only one member 4 for mounting the eccentric shaft, and accordingly only one eccentric and one pinion mechanism for adjusting the eccentricity. Moreover, the number of the discs 35 may be larger or smaller than in the example shown, according to the conditions for the time being. The connection between the eccentric shaft and the intermediate shaft carrying the discs 35, and also the return movement, may be preferably effected by means of steel chains, ropes or bands, although belts or cords or other material, such as leather, hemp or the like, may of course also be used for the same purpose.

The pinion gear provided for adjusting the eccentricity can also be employed, apart from in combination with a gear of the type shown in the drawings, for effecting the relative adjustment of two intercoupled shafts in general, the adjustment being obtainable both during the running of the shafts and when they are at rest.

I claim:—

1. Intermittent actuating mechanism, comprising in combination, a driving shaft, rotational members connected with said shaft, eccentric discs carrying an eccentric shaft and mounted eccentrically in said rotational members, a worm gear adapted to rotate said eccentric discs inside said members for the purpose of setting up a relative radial displacement between the axes of said eccentric shaft and said driving shaft, a cone pinion connected with said worm and gearinig with a crown wheel mounted concentrically with said driving shaft, but rotatable in relation thereto, planet pinions gearing with said crown wheel, a second ring of planet wheels rotating in common with the first mentioned planet pinions, a stationary crown wheel gearing with the second-mentioned planet wheels, a toothed crown connected with said driving shaft and also gearing with the second-mentioned planet wheels, a crown wheel adapted to be turned by means of a hand wheel and meshing with another crown wheel, gearing with the first-mentioned pinions, both of these two last mentioned crown wheels remaining stationary during the rotation of the eccentric, flexible traction members, means connecting said discs with said flexible traction members and exerting a tractive effort on said traction members, discs around which said flexible traction members are laid, intermittently rotated intermediate shafts adapted to be coupled with said second-mentioned discs and a driven shaft actuated through the agency of said intermediate shafts.

2. Intermittent actuating mechanism, comprising in combination, flexible traction members, a variable eccentric actuated by a driving shaft and exerting a tractive effort on said flexible traction members, a plurality of discs intermittently rotated intermediate shafts adapted to be coupled with said discs, by said flexible traction members which are passed about said discs, said discs having a curved shape, so as to produce a uniform rotation of the intermediate shafts irrespective of the rate of the pull for the time being, and a driven shaft actuated through the agency of said intermediate shafts.

3. Intermittent actuating mechanism, comprising in combination, a driving shaft, a variable eccentric connected to and actuated by said driving shaft, flexible traction members operatively connected to and upon which a tractive effort is exerted by said eccentric, discs around which said flexible traction members are laid, chains partially embracing and connecting said discs for the purpose of effecting their return movement, springs connecting together the free ends of said chains, intermittently rotated intermediate shafts adapted to be coupled with said discs and a driven shaft operatively connected to and actuated through the agency of said intermediate shafts.

4. A combination as set forth in claim 3, in which the disks have a curved shape so as to produce a uniform rotation of the intermediate shafts irrespective of the rate of the pull at a given instant.

5. A combination as set forth in claim 3, in which the connection between the eccentric and each flexible traction member comprises a pin and an eccentric roller or disc mounted on said pin to be engaged with the looped end of one of the flexible traction members.

6. Intermittent actuating mechanism comprising in combination flexible traction members, a variable eccentric actuated by a driving shaft, means connecting said variable eccentric to said flexible traction members to exert the tractive effort caused by the movement of said eccentric on said flexible traction members, a plurality of disks about which said flexible traction members are engaged, intermittently rotated intermediate shafts adapted to be coupled with said discs, the said connecting means between the eccentric and each flexible traction member consisting of an eccentric roller or disk about which the looped end of one of the said flexible traction members is engaged.

In testimony whereof I affix my signature.

HERBERT FÜSSEL.